United States Patent
Rodrigo

(10) Patent No.: US 12,126,692 B2
(45) Date of Patent: Oct. 22, 2024

(54) DISCOVERY REQUEST AND RESPONSE HANDLING

(71) Applicant: Telefonaktiebolaget LM Ericsson (publ), Stockholm (SE)

(72) Inventor: Maria Cruz Bartolome Rodrigo, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/270,645

(22) PCT Filed: Feb. 22, 2021

(86) PCT No.: PCT/EP2021/054326
§ 371 (c)(1),
(2) Date: Jun. 30, 2023

(87) PCT Pub. No.: WO2022/152406
PCT Pub. Date: Jul. 21, 2022

(65) Prior Publication Data
US 2024/0064212 A1    Feb. 22, 2024

(30) Foreign Application Priority Data

Jan. 14, 2021   (EP) ..................... 21382018

(51) Int. Cl.
*H04L 67/51* (2022.01)
*H04L 41/0806* (2022.01)
*H04W 48/16* (2009.01)

(52) U.S. Cl.
CPC .......... *H04L 67/51* (2022.05); *H04L 41/0806* (2013.01); *H04W 48/16* (2013.01)

(58) Field of Classification Search
CPC ..... H04L 67/51; H04L 41/0806; H04W 48/16
(Continued)

(56) References Cited

U.S. PATENT DOCUMENTS

2020/0127916 A1   4/2020   Krishan
2020/0314615 A1   10/2020   Patil et al.
(Continued)

FOREIGN PATENT DOCUMENTS

CN    111770122 A    10/2020
WO    2020217224 A1   10/2020

OTHER PUBLICATIONS

Gulbrandsen, A. et al., "A DNS RR for specifying the location of services (DNS SRV)", Internet Engineering Task Force (IETF), Feb. 2000, pp. 1-12, RFC 2782, IETF.
(Continued)

*Primary Examiner* — Wing F Chan
*Assistant Examiner* — Leon Y Tseng
(74) *Attorney, Agent, or Firm* — COATS & BENNETT, PLLC

(57) ABSTRACT

There is provided a method performed by a network repository function (NRF) node (60). In response to receiving a request (400), transmission of a response (402) is initiated towards a network node (10, 20) that initiated transmission of the request (400). The network node (10, 20) is a first network function (NF) node (20) of a service consumer or a first service communication proxy (SCP) node (10) that is configured to operate as an SCP between the first NF node (20) and second NF nodes (30) of at least one service producer. The response (402) comprises first information indicative of any second NF nodes (30) identified for providing a service (40) requested by the first NF node (20), and second information indicative of whether any second NF nodes (30) identified for providing the service are identified based on a criterion, and/or if a plurality of second NF nodes (30) are identified, third information indicative of whether the plurality of second NF nodes (30) are prioritised according to the criterion.

20 Claims, 7 Drawing Sheets

(58) Field of Classification Search
USPC .......................................................... 709/222
See application file for complete search history.

(56) References Cited

U.S. PATENT DOCUMENTS

| | | | |
|---|---|---|---|
| 2022/0070648 A1* | 3/2022 | Krishan | ................. H04L 67/56 |
| 2023/0359492 A1* | 11/2023 | Mouroulis | .......... H04L 41/0806 |
| 2023/0362267 A1* | 11/2023 | Landais | ................ H04L 67/567 |

OTHER PUBLICATIONS

3rd Generation Partnership Project, "3rd Generation Partnership Project; Technical Specification Group Core Network and Terminals; 5G System; Network Function Repository Services; Stage 3 (Release 16)", Technical Specification, 3GPP TS 29.510 V16.5.0, Sep. 2020, pp. 1-195, 3GPP.

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.4.0, Mar. 2020, pp. 1-430, 3GPP.

* cited by examiner

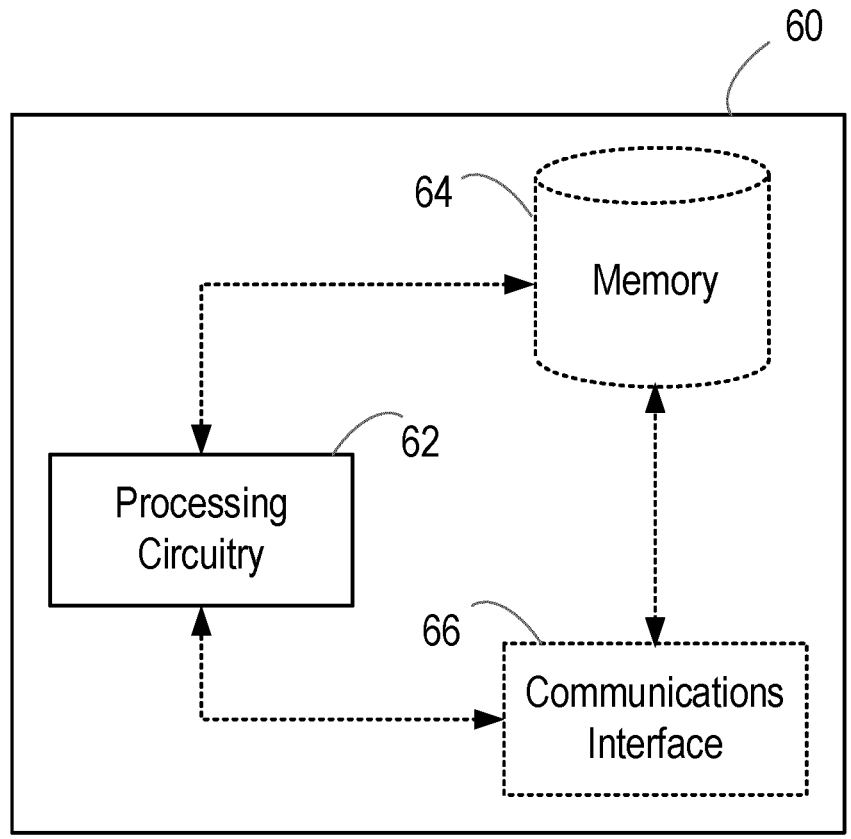

Figure 4

Initiate transmission of a discovery response, wherein the discovery response comprises first information indicative of any second NF nodes identified for providing the service and second information indicative of whether the identification of any second NF nodes for providing the service is based on a criterion and/or if a plurality of second NF nodes are identified for providing the service, third information indicative of whether the plurality of second NF nodes are prioritised according to the criterion — 602

Figure 5

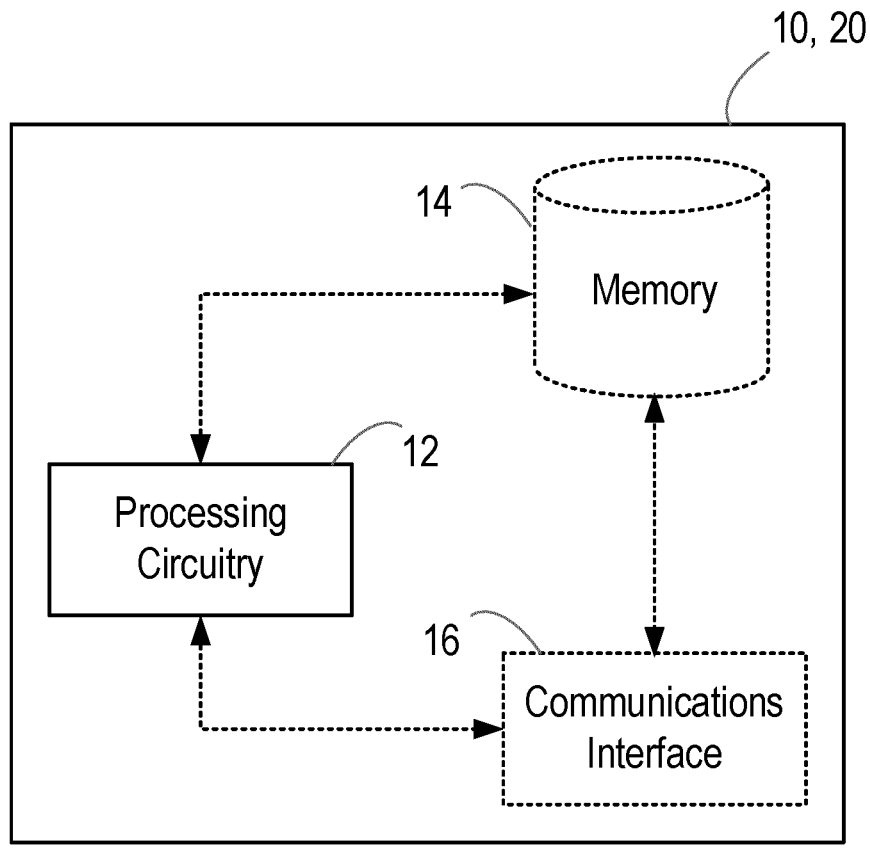

Figure 6

Receive a discovery response, wherein the discovery response comprises first information indicative of any second NF nodes identified for providing the service and second information indicative of whether the identification of any second NF nodes for providing the service is based on a criterion and/or if a plurality of second NF nodes are identified for providing the service, third information indicative of whether the plurality of second NF nodes are prioritised according to the criterion — 102

Figure 7

DISCOVERY REQUEST AND RESPONSE HANDLING

TECHNICAL FIELD

The disclosure relates to methods for handling a discovery request and response in a network, and nodes configured to operate in accordance with those methods.

BACKGROUND

There exist various techniques for handling a request for a service in a network. A service request is generally from a consumer of the service ("service consumer") to a producer of the service ("service producer"). For example, a service request may be from a network function (NF) node of a service consumer to an NF node of a service producer. The NF node of the service consumer and the NF node of the service producer can communicate directly or indirectly. This is referred to as direct communication and indirect communication respectively. In the case of indirect communication, the NF node of the service consumer and the NF node of the service producer may communicate via a service communication proxy (SCP) node.

FIG. 1A-D illustrates different existing systems for handling service requests, as set out in 3GPP TS 23.501 v16.4.0. In more detail, FIGS. 1A and 1B illustrate systems that use direct communication, while FIGS. 1C and 1D illustrate systems that use indirect communication.

In the systems illustrated in FIGS. 1A and 1B, a service request is sent directly from the NF node of the service consumer to the NF node of the service producer. A response to the service request is sent directly from the NF node of the service producer to the NF node of the service consumer. Similarly, any subsequent service requests are sent directly from the NF node of the service consumer to the NF node of the service producer. The system illustrated in FIG. 1B also comprises a network repository function (NRF) node. Thus, in the system illustrated in FIG. 1B, the NF node of the consumer can query the NRF node to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In the system illustrated in FIG. 1A, the NRF node is not used and instead the NF node of the consumer may be configured with the NF profile(s) of the NF node(s) of the service producer.

In the systems illustrated in FIGS. 1C and 1D, a service request is sent indirectly from the NF node of the service consumer to the NF node of the service producer via a service communication proxy (SCP) node. A response to the service request is sent indirectly from the NF node of the service producer to the NF node of the service consumer via the SCP. Similarly, any subsequent service requests are sent indirectly from the NF node of the service consumer to the NF node of the service producer via the SCP. The systems illustrated in FIGS. 10 and D also comprise an NRF node.

In the system illustrated in FIG. 10, the NF node of the consumer can query the NRF node to discover suitable NF nodes of the service producer to which to send the service request. In response to such a query, the NF node of the consumer can receive an NF profile for one or more NF nodes of the service producer and, based on the received NF profile(s) can select an NF node of the service producer to which to send the service request. In this case, the service request sent from the NF node of the service consumer to the SCP comprises the address of the selected NF node of the service producer. The NF node of the service consumer can forward the service request without performing any further discovery or selection. In case the selected NF node of the service producer is not accessible for any reason, it may be up to the NF node of the service consumer to find an alternative. In other cases, the SCP may communicate with the NRF node to acquire selection parameters (e.g. location, capacity, etc.) and the SCP may select an NF node of the service producer to which to send the service request.

In the system illustrated in FIG. 1D, the NF node of the consumer does not carry out the discovery or selection process. Instead, the NF node of the consumer adds any necessary discovery and selection parameters (required to find a suitable NF node of the service producer) to the service request that it sends via the SCP. The SCP uses the request address and the discovery and selection parameters in the service request to route the service request to a suitable NF node of the service producer. The SCP can perform discovery with the NRF node.

For the fifth generation core (5GC), from Release 16, the SCP is included as a network element to allow indirect communication between an NF node of a service consumer and an NF node of a service producer. The indirect communication that is used can be either of the two indirect communications options described earlier with reference to FIGS. 1C and 1D.

Each of the techniques illustrated in FIGS. 1B, 1C and 1D involve a discovery process for discovering NF nodes of a service producer, to which a service request can be sent. The methods described herein relate to handling such a discovery request for use in such a discovery process. The discovery process will now be described in more detail with reference to FIGS. 2 and 3.

FIG. 2 is a signalling diagram illustrating an exchange of signals in an existing system, such as the system illustrated in FIG. 1B or the system illustrated in FIG. 1C. The system illustrated in FIG. 2 comprises a first SCP node 10, a first NF node of a service consumer ("NFc"), a second NF node 30 of a service producer ("NFp"), and an NRF node 60. The first SCP node 10 is configured to operate as an SCP between the first NF node 20 and the second NF node 30. The second NF node 30 can be configured to provide a service.

FIG. 2 relates to a discovery process that is performed between the first NF node 20 and the NRF node 60. As illustrated by arrow 200 of FIG. 2, the first NF node 20 initiates transmission of a discovery request ("Nnrf_NFDisc req") towards the NRF node 60. The discovery request 200 is a request for information indicative of one or more second NF nodes 30 for providing a service requested by the first NF node 20. The discovery request comprises information indicative of a preferred location (e.g. preferred-locality=X) for the one or more second NF nodes 30. The NRF node 60 may or may not take into account the preferred location when identifying any second NF nodes 30 to provide to the first NF node 20. As illustrated by arrow 202 of FIG. 2, the NRF node 60 initiates transmission of a discovery response ("Nnrf_NFDisc rsp") towards the first NF node 20. The discovery response comprises information indicative of any second NF nodes 30 identified for providing the service.

FIG. 3 is a signalling diagram illustrating an exchange of signals in another existing system, such as the system illustrated in FIG. 1D. The system and corresponding technique illustrated in FIG. 3 is as described earlier with reference to FIG. 2, except that transmission of the discovery request 300 of FIG. 3 is initiated by the first SCP node 10 and transmission of the discovery response 302 of FIG. 3 is initiated towards the first SCP node 10.

Once the network node 10, 20 that initiated transmission of the discovery request 200, 300 receives the discovery response 202, 302 comprising information indicative of any identified second NF nodes 30, the network node 10, 20 can select a second NF node for providing the service. In an example, the following second NF nodes 30 may be discovered by the NRF node 60:

| Second NF node | Locality of second NF node | Priority value assigned to second NF node |
| --- | --- | --- |
| NFp1 | Region1-DC1 | 3 |
| NFp2 | Region1-DC2 | 2 |
| NFp3 | Region2 | 1 |

The discovery response 202, 302 thus comprises information indicative that any of NFp1, NFp2, NFp3 may be selected for providing the service in this example. The network node 10, 20 that receives this information selects one of the second NF nodes based on priority. The second NF node 30 that is selected is thus NFp3 as it has the highest priority, which is indicated by the lowest priority value. If NFp3 fails, then NFp2 is selected as it has the next highest priority.

In another example, if the locality of the network node 10, 20 is Region1-DC2 and the discovery request 200, 300 comprises this locality as the preferred locality, the NRF node 60 returns NFp2 as it matches the preferred locality. However, the NRF node 60 may optionally also return the non-matching second NF nodes 30 with an altered priority. An example of the altered priority is shown below:

| Second NF node | Locality of second NF node | Priority value assigned to second NF node |
| --- | --- | --- |
| NFp1 | Region1-DC1 | 2 |
| NFp2 | Region1-DC2 | 1 |
| NFp3 | Region2 | 3 |

As before, the discovery response 202, 302 comprises information indicative that any of NFp1, NFp2, NFp3 may be selected for providing the service in this example. The network node 10, 20 that receives this information selects one of the second NF nodes 30 based on locality. The second NF node 30 that is selected is thus NFp2 as it is in the same locality as the network node 10, 20.

However, in some situations, the NRF node 60 may not actually support a preferred locality functionality and/or at least one of the second NF nodes 30 may not support modification of assigned priorities. The latter may be the case where at least one of the second NF nodes 30 uses assigned priorities in such a way that alteration of these assigned priorities by the NRF node 60 will cause issues.

For example, a Session Management Function (SMF) 1+1 active/standby model uses a priority assigned to a second NF node 30 to identify a role of that second NF node 30. Specifically, an active second NF node 30 can be identified as having a higher priority than a standby second NF node 30. In this case, if a priority assigned to the second NF nodes 30 is modified, traffic may reach a second NF node 30 that is in a standby role and such a second NF node 30 will reject the traffic. If there are only two second NF nodes 30, there is a workaround that consists of not using the locality at all or using the same locality for both second NF nodes 30.

Then, the priority does not need to be overwritten by the NRF node 60 and the active second NF node 30 will always be selected. In this case, locality does not take precedence over priority as long as only one active second NF node 30, regardless of its location, is able to respond to the service request.

However, in the case of an SMF N+M active/standby model, it may be required that the network node 10, 20 has the ability to select an active second NF node 30 (e.g. among N active instances) according to locality. For example, if it is not possible to select an active second NF node 30 that is in the same location as or closest to the network node 10, 20, then this can negatively affect signalling and latency in the system.

SUMMARY

It is an object of the disclosure to obviate or eliminate at least some of the above-described disadvantages associated with existing techniques.

In particular, according to the existing techniques, the network node that initiates transmission of the discovery request is unaware of whether a received discovery response takes into account any criterion, e.g. that may have been specified in the discovery request. As such, in the existing techniques, the network node that initiates transmission of the discovery request is unable to make an informed choice when deciding on an NF node of the service producer to provide a service. The NF node of the service producer that is selected according to the existing techniques may thus not be suitable, or may not be the most suitable, for providing the service. For example, according to existing techniques, the selected NF node of the service producer may be inactive (or in standby mode) and thus unable to provide the service, it may be further away from the network node than other NF nodes of the service producer such that using it to provide the service negatively affects the signalling and latency in the system, it may be overloaded and thus unable to provide the best quality of service, it may not have enough available capacity to even provide the service, etc.

It has thus been realised that an improved system can be provided if the network node that initiates transmission of the discovery request is provided with additional information that enables it to make a better informed choice of an NF node of a service producer to provide a service.

Therefore, according to an aspect of the disclosure, there is provided a method for handling a discovery request in a network. The method is performed by an NRF node. The method comprises, in response to receiving the discovery request, initiating transmission of a discovery response towards a network node that initiated transmission of the discovery request towards the NRF node. The network node is a first NF node of a service consumer or a first SCP node that is configured to operate as an SCP between the first NF node and second NF nodes of at least one service producer. The discovery request is a request for information indicative of one or more second NF nodes for providing a service requested by the first NF node. The discovery response comprises first information indicative of any second NF nodes identified for providing the service, and second information indicative of whether any second NF nodes identified for providing the service are identified based on a criterion, and/or if a plurality of second NF nodes are identified for providing the service, third information indicative of whether the plurality of second NF nodes are prioritised according to the criterion.

According to another aspect of the disclosure, there is also provided an NRF node comprising processing circuitry configured to operate in accordance with the method described in respect of the NRF node. In some embodiments, the NRF node may comprise at least one memory for storing instructions which, when executed by the processing circuitry, cause the NRF node to operate in accordance with the method described in respect of the NRF node.

According to another aspect of the disclosure, there is also provided a method for handling a discovery response in a network. The method is performed by a network node. The network node is a first NF node of a service consumer or a first SCP node that is configured to operate as an SCP between the first NF node and second NF nodes of at least one service producer. The method comprises receiving the discovery response, wherein transmission of the discovery response towards the network node is initiated by an NRF node in response to a discovery request. The discovery request is a request for information indicative of one or more second NF nodes for providing a service requested by the first NF node. The discovery response comprises first information indicative of any second NF nodes identified for providing the service, and second information indicative of whether any second NF nodes identified for providing the service are identified based on a criterion, and/or if a plurality of second NF nodes are identified for providing the service, third information indicative of whether the plurality of second NF nodes are prioritised according to the criterion.

According to another aspect of the disclosure, there is provided a network node comprising processing circuitry configured to operate in accordance with the method described in respect of the network node. In some embodiments, the network node may comprise at least one memory for storing instructions which, when executed by the processing circuitry, cause the network node to operate in accordance with the method described in respect of the network node.

According to another aspect of the disclosure, there is provided a method performed by a system. The method comprises the method described in respect of the NRF node and the method described in respect of the network node.

According to another aspect of the disclosure, there is provided a system comprising at least one NRF node as described earlier and at least one network node as described earlier.

According to another aspect of the disclosure, there is provided a computer program comprising instructions which, when executed by processing circuitry, cause the processing circuitry to perform the method described in respect of the NRF node and/or the method described in respect of the network node.

According to another aspect of the disclosure, there is provided a computer program product, embodied on a non-transitory machine-readable medium, comprising instructions which are executable by processing circuitry to cause the processing circuitry to perform the method described in respect of the NRF node and/or the method described in respect of the network node.

In this way, as the network node that initiates transmission of the discovery request is provided with the additional second information (indicative of whether any second NF nodes identified for providing the service are identified based on a criterion) and/or additional third information (indicative of whether the plurality of second NF nodes are prioritised according to the criterion), the network node has the information available to it for it to be capable of making a better informed choice of an NF node of a service producer to provide a service.

Therefore, an improved technique for handling discovery requests and responses in a network is provided.

BRIEF DESCRIPTION OF THE DRAWINGS

For a better understanding of the technique, and to show how it may be put into effect, reference will now be made, by way of example, to the accompanying drawings, in which:

FIG. 4 is a block diagram illustrating an NRF node according to an embodiment;

FIG. 5 is a flowchart illustrating a method performed by an NRF node according to an embodiment;

FIG. 6 is a block diagram illustrating a network node according to an embodiment;

FIG. 7 is a flowchart illustrating a method performed by a network node according to an embodiment;

DETAILED DESCRIPTION

Figure 1:
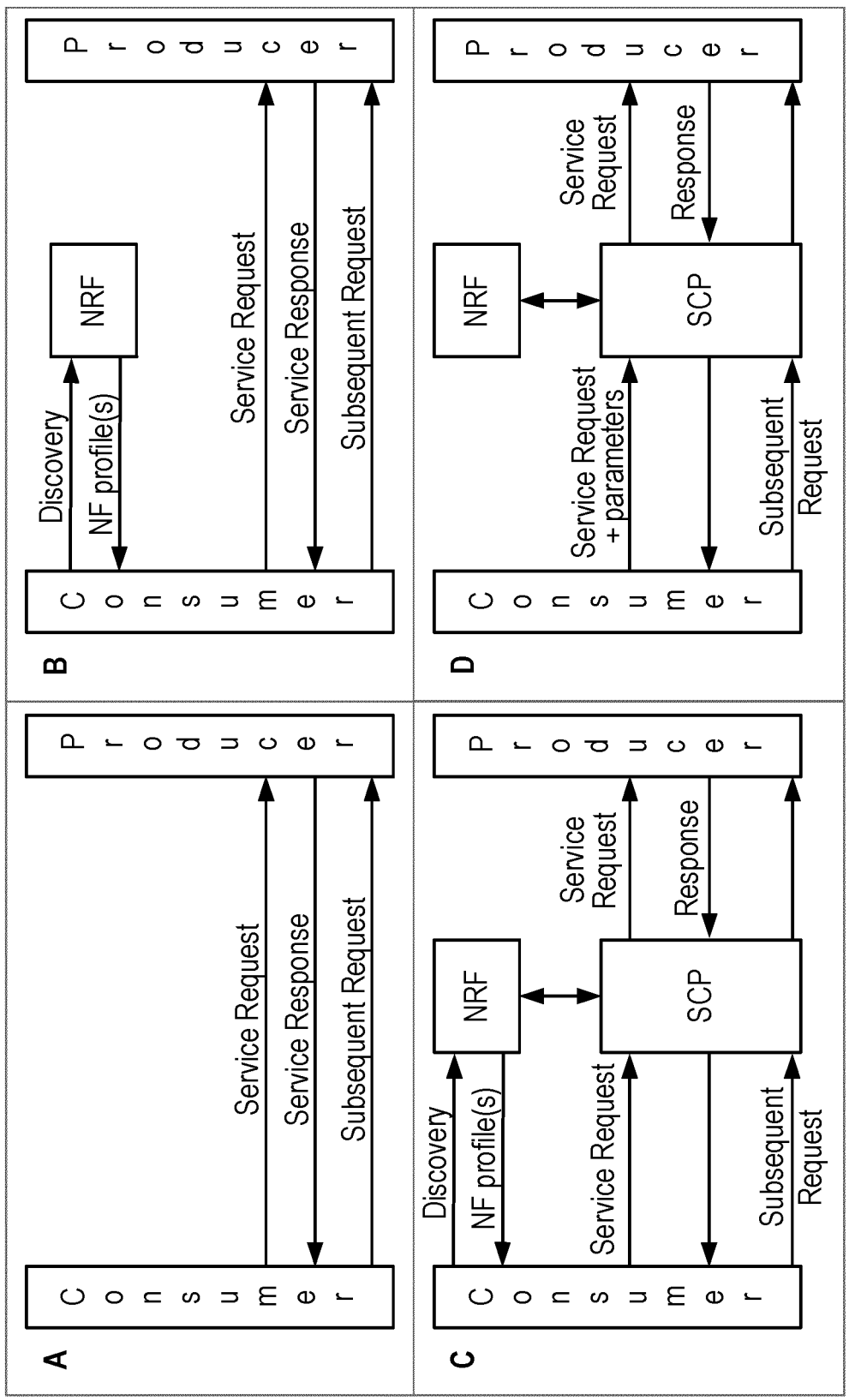
FIG. 1A-D is a block diagram illustrating different existing systems.
Figure 2:
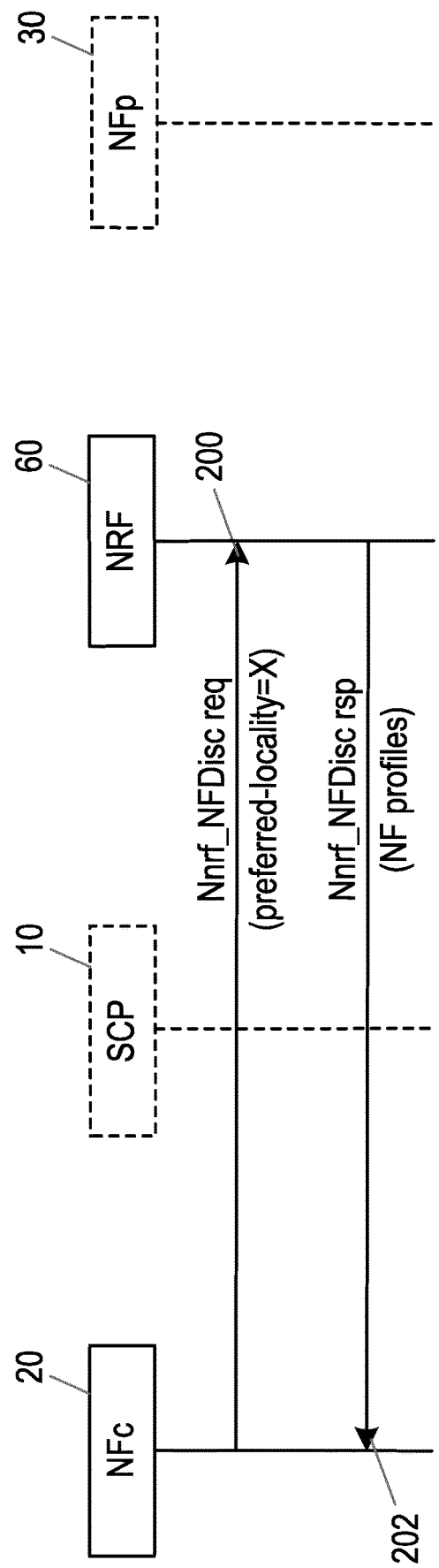
FIG. 2 is a signalling diagram illustrating an exchange of signals in an existing system.
Figure 3:
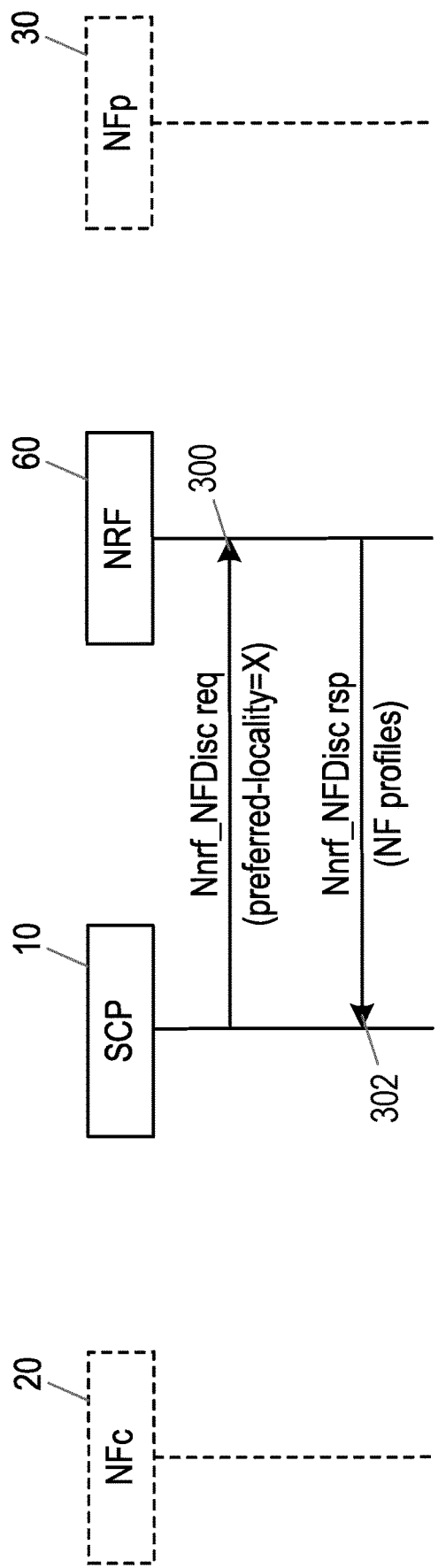
FIG. 3 is a signalling diagram illustrating an exchange of signals in an existing system.

Herein, techniques for handling a discovery request and response in a network are described. A discovery request can also be referred to as a request for discovery. A discovery request is a request for information indicative of one or more network function (NF) nodes of a service producer for providing a service requested by an NF node of a service consumer. Generally, a service is software intended to be managed for users. Herein, a service can be any type of service, such as a communication service, a context management (e.g. user equipment context management (UECM)) service, a data management (DM) service, or any other type of service.

The techniques described herein can be used in respect of any network, such as any communications network. The network may be a fifth generation (5G) network or any other generation network. In some embodiments, the network may be a core network or a radio access network (RAN). The techniques are implemented by a network repository function (NRF) node and a network node. The network node referred to herein may be a first NF node of a service consumer or a first service communication proxy (SCP) node. The first SCP node is a node that is configured to operate as an SCP between the first NF node and any second NF nodes of at least one service producer. Generally, an NRF node is a node that provides NF service registration and discovery. An NRF node thus enables NF nodes to identify services offered by other NF nodes. Further definitions of an NRF node are provided in 3GPP TS 29.510 V16.5.0 and the NRF node described herein may be capable of operating in accordance with any of the methods described therein.

An NF is a third generation partnership project (3GPP) adopted, or 3GPP defined, processing function in a network, which has defined functional behaviour and 3GPP defined interfaces. An NF can be implemented either as a network element on a dedicated hardware, as a software instance running on a dedicated hardware, or as a virtualised function instantiated on an appropriate platform, e.g. on a cloud infrastructure. Herein, the term "node" in relation to an "NF node" will be understood to cover each of these scenarios. Herein, references to a plurality of NF nodes of a service producer may refer to, for example, functionally equivalent instances of NF nodes of the service producer.

FIG. 4 illustrates a network repository function (NRF) node 60 in accordance with an embodiment. The NRF node 60 is for handling a discovery request in a network. In some embodiments, the NRF node 60 can, for example, be a physical machine (e.g. a server) or a virtual machine (VM).

As illustrated in FIG. 4, the NRF node 60 comprises processing circuitry (or logic) 62. The processing circuitry 62 controls the operation of the NRF node 60 and can implement the method described herein in respect of the NRF node 60. The processing circuitry 62 can be configured or programmed to control the NRF node 60 in the manner described herein. The processing circuitry 62 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the NRF node 60. In some embodiments, the processing circuitry 62 can be configured to run software to perform the method described herein in respect of the NRF node 60. The software may be containerized according to some embodiments. Thus, in some embodiments, the processing circuitry 62 may be configured to run a container to perform the method described herein in respect of the NRF node 60.

Briefly, the processing circuitry 62 of the NRF node 60 is configured to, in response to receiving the discovery request, initiate transmission of a discovery response towards a network node that initiated transmission of the discovery request towards the NRF node 60. The network node is a first NF node of a service consumer or a first SCP node that is configured to operate as an SCP between the first NF node and second NF nodes of at least one service producer. The discovery request is a request for information indicative of one or more second NF nodes for providing a service requested by the first NF node. The discovery response comprises first information indicative of any second NF nodes identified for providing the service, and second information indicative of whether any second NF nodes identified for providing the service are identified based on a criterion, and/or if a plurality of second NF nodes are identified for providing the service, third information indicative of whether the plurality of second NF nodes are prioritised according to the criterion.

As illustrated in FIG. 4, in some embodiments, the NRF node 60 may optionally comprise a memory 64. The memory 64 of the NRF node 60 can comprise a volatile memory or a non-volatile memory. In some embodiments, the memory 64 of the NRF node 60 may comprise a non-transitory media. Examples of the memory 64 of the NRF node 60 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 62 of the NRF node 60 can be connected to the memory 64 of the NRF node 60. In some embodiments, the memory 64 of the NRF node 60 may be for storing program code or instructions which, when executed by the processing circuitry 62 of the NRF node 60, cause the NRF node 60 to operate in the manner described herein in respect of the NRF node 60. For example, in some embodiments, the memory 64 of the NRF node 60 may be configured to store program code or instructions that can be executed by the processing circuitry 62 of the NRF node 60 to cause the NRF node 60 to operate in accordance with the method described herein in respect of the NRF node 60. Alternatively or in addition, the memory 64 of the NRF node 60 can be configured to store any information, data, messages, requests, responses, indications, notifications, signals, or similar, that are described herein. The processing circuitry 62 of the NRF node 60 may be configured to control the memory 64 of the NRF node 60 to store information, data, messages, requests, responses, indications, notifications, signals, or similar, that are described herein.

In some embodiments, as illustrated in FIG. 4, the NRF node 60 may optionally comprise a communications interface 66. The communications interface 66 of the NRF node 60 can be connected to the processing circuitry 62 of the NRF node 60 and/or the memory 64 of NRF node 60. The communications interface 66 of the NRF node 60 may be operable to allow the processing circuitry 62 of the NRF node 60 to communicate with the memory 64 of the NRF node 60 and/or vice versa. Similarly, the communications interface 66 of the NRF node 60 may be operable to allow the processing circuitry 62 of the NRF node 60 to communicate with the network node (e.g. the first NF node and/or first SCP node), any second NF nodes, and/or any other node. The communications interface 66 of the NRF node 60 can be configured to transmit and/or receive information, data, messages, requests, responses, indications, notifications, signals, or similar, that are described herein. In some embodiments, the processing circuitry 62 of the NRF node 60 may be configured to control the communications interface 66 of the NRF node 60 to transmit and/or receive information, data, messages, requests, responses, indications, notifications, signals, or similar, that are described herein.

Although the NRF node 60 is illustrated in FIG. 4 as comprising a single memory 64, it will be appreciated that the NRF node 60 may comprise at least one memory (i.e. a single memory or a plurality of memories) 64 that operate in the manner described herein. Similarly, although the NRF node 60 is illustrated in FIG. 4 as comprising a single communications interface 66, it will be appreciated that the NRF node 60 may comprise at least one communications interface (i.e. a single communications interface or a plurality of communications interface) 66 that operate in the manner described herein. It will also be appreciated that FIG. 4 only shows the components required to illustrate an embodiment of the NRF node 60 and, in practical implementations, the NRF node 60 may comprise additional or alternative components to those shown.

FIG. 5 is a flowchart illustrating a method performed by an NRF node 60 in accordance with an embodiment. The method is for handling a discovery request in the network. The NRF node 60 described earlier with reference to FIG. 4 is configured to operate in accordance with the method of FIG. 5. The method can be performed by or under the control of the processing circuitry 62 of the NRF node 60.

As illustrated at block 602 of FIG. 5, transmission of a discovery response is initiated towards a network node that initiated transmission of the discovery request towards the NRF node 60. As mentioned earlier, the network node is an NF node of a service consumer or a first SCP node that is configured to operate as an SCP between the first NF node and second NF nodes of at least one service producer. Transmission of the discovery response is initiated in response to receiving the discovery request. The discovery request is a request for information indicative of one or more second NF nodes for providing a service requested by the first NF node. The discovery response comprises first information indicative of any second NF nodes identified for providing the service, and second information indicative of whether any second NF nodes identified for providing the service are identified based on a criterion (i.e. whether the identification of any second NF nodes for providing the service is based on the criterion), and/or if a plurality of second NF nodes are identified for providing the service, third information indicative of whether the plurality of second NF nodes are prioritised according to the criterion.

Herein, the term "initiate" can mean, for example, cause or establish. Thus, the processing circuitry 62 of the NRF node 60 can be configured to itself transmit the discovery response (e.g. via a communications interface 66 of the NRF node 60) or can be configured to cause another node to transmit the discovery response.

FIG. 6 illustrates a network node 10, 20 in accordance with an embodiment. The network node 10, 20 is for handling a discovery response in a network. The network node 10, 20 can be a first NF node 20 of a service consumer or a first SCP node 10. The first SCP node 10 is configured to operate as an SCP between the first NF node 20 and second NF nodes of at least one service producer. In some embodiments, the network node 10, 20 (e.g. the first SCP node 10 and/or the first NF node 20) can, for example, be a physical machine (e.g. a server) or a virtual machine (VM). The first NF node 20 can be, for example, a user equipment (UE).

As illustrated in FIG. 6, the network node 10, 20 comprises processing circuitry (or logic) 12. The processing circuitry 12 controls the operation of the network node 10, 20 and can implement the method described herein in respect of the network node 10, 20. The processing circuitry 12 can be configured or programmed to control the network node 10, 20 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the network node 10, 20. In some embodiments, the processing circuitry 12 can be configured to run software to perform the method described herein in respect of the network node 10, 20. The software may be containerized according to some embodiments. Thus, in some embodiments, the processing circuitry 12 may be configured to run a container to perform the method described herein in respect of the network node 10, 20.

Briefly, the processing circuitry 12 of the network node 10, 20 is configured to receive the discovery response. Transmission of the discovery response towards the network node is initiated by an NRF node 60 in response to a discovery request. The discovery request is a request for information indicative of one or more second NF nodes for providing a service requested by the first NF node 20. The discovery response comprises first information indicative of any second NF nodes identified for providing the service, and second information indicative of whether any second NF nodes identified for providing the service are identified based on a criterion, and/or if a plurality of second NF nodes are identified for providing the service, third information indicative of whether the plurality of second NF nodes are prioritised according to the criterion.

As illustrated in FIG. 6, in some embodiments, the network node 10, 20 may optionally comprise a memory 14. The memory 14 of the network node 10, 20 can comprise a volatile memory or a non-volatile memory. In some embodiments, the memory 14 of the network node 10, 20 may comprise a non-transitory media. Examples of the memory 14 of the network node 10, 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the network node 10, 20 can be connected to the memory 14 of the network node 10, 20. In some embodiments, the memory 14 of the network node 10, 20 may be for storing program code or instructions which, when executed by the processing circuitry 12 of the network node 10, 20, cause the network node 10, 20 to operate in the manner described herein in respect of the network node 10, 20. For example, in some embodiments, the memory 14 of the network node 10, 20 may be configured to store program code or instructions that can be executed by the processing circuitry 12 of the network node 10, 20 to cause the network node 10, 20 to operate in accordance with the method described herein in respect of the network node 10, 20. Alternatively or in addition, the memory 14 of the network node 10, 20 can be configured to store any information, data, messages, requests, responses, indications, notifications, signals, or similar, that are described herein. The processing circuitry 12 of the network node 10, 20 may be configured to control the memory 14 of the network node 10, 20 to store information, data, messages, requests, responses, indications, notifications, signals, or similar, that are described herein.

In some embodiments, as illustrated in FIG. 6, the network node 10, 20 may optionally comprise a communications interface 16. The communications interface 16 of the network node 10, 20 can be connected to the processing circuitry 12 of the network node 10, 20 and/or the memory 14 of network node 10, 20. The communications interface 16 of the network node 10, 20 may be operable to allow the processing circuitry 12 of the network node 10, 20 to communicate with the memory 14 of the network node 10, 20 and/or vice versa. Similarly, the communications interface 16 of the network node 10, 20 may be operable to allow the processing circuitry 12 of the network node 10, 20 to communicate with the NRF node 60, any second NF nodes, and/or any other node, and/or the communications interface 16 of the first NF node 20 to communicate with the first SCP node 10, and/or the communications interface 16 of the first SCP node 10 to communicate with the first NF node 20. The communications interface 16 of the network node 10, 20 can be configured to transmit and/or receive information, data, messages, requests, responses, indications, notifications, signals, or similar, that are described herein. In some embodiments, the processing circuitry 12 of the network node 10, 20 may be configured to control the communications interface 16 of the network node 10, 20 to transmit and/or receive information, data, messages, requests, responses, indications, notifications, signals, or similar, that are described herein.

Although the network node 10, 20 is illustrated in FIG. 6 as comprising a single memory 14, it will be appreciated that the network node 10, 20 may comprise at least one memory (i.e. a single memory or a plurality of memories) 14 that operate in the manner described herein. Similarly, although the network node 10, 20 is illustrated in FIG. 6 as comprising a single communications interface 16, it will be appreciated that the network node 10, 20 may comprise at least one communications interface (i.e. a single communications interface or a plurality of communications interface) 16 that operate in the manner described herein. It will also be appreciated that FIG. 6 only shows the components required to illustrate an embodiment of the network node 10, 20 and, in practical implementations, the network node 10, 20 may comprise additional or alternative components to those shown.

FIG. 7 is a flowchart illustrating a method performed by a network node 10, 20 in accordance with an embodiment. As mentioned earlier, the network node 10, 20 can be the first NF node 20, or the first SCP node 10 that is configured to operate as an SCP between the first NF node 20 and second NF nodes of at least one service producer. The method is for handling a discovery response in the network. The network node 10, 20 described earlier with reference to FIG. 6 is configured to operate in accordance with the method of FIG. 7. The method can be performed by or under the control of the processing circuitry 12 of the network node 10, 20.

As illustrated at block 102 of FIG. 7, the discovery response is received. Transmission of the discovery response towards the network node is initiated by an NRF node 60 in response to a discovery request. The discovery request is a request for information indicative of one or more second NF nodes for providing a service requested by the first NF node 20. The discovery response comprises first information indicative of any second NF nodes identified for providing the service, and second information indicative of whether any second NF nodes identified for providing the service are identified based on a criterion, and/or if a plurality of second NF nodes are identified for providing the service, third information indicative of whether the plurality of second NF nodes are prioritised according to the criterion.

The criterion referred to herein can be a criterion associated with each second NF node 30. For example, the criterion referred to herein can be a characteristic (or property) of each second NF node 30. In some embodiments, the criterion referred to herein may be defined in a profile of each second NF node 30. The criterion referred to herein may also be referred to in the art as an attribute or a parameter. Examples of some criteria include, but are not limited to an instance of each second NF node 30, a service instance provided by each second NF node 30, a priority assigned to each second NF node 30, a location (which may also be referred to in the art as locality or proximity) of each second NF node 30, a load on each second NF node 30, a capacity of each second NF node 30, and/or any other criterion, or any combination of criteria. In some embodiments, a criterion may be predefined (e.g. preconfigured, such as in a policy or in a profile of each second NF node) or may be received in requests and/or responses at the NRF node 60. In some embodiments, it may be predefined (e.g. preconfigured, such as in a policy or in a profile of each second NF node) that a criterion takes precedence over any other criteria, e.g. locality takes precedence over any other criteria, or priority takes precedence over any other criteria, etc.

In some embodiments, the criterion may be any criterion that is defined in 3GPP TS 29.510 V16.50, such as any one or more of the criteria defined in Table 6.1.6.2.2-1 of 3GPP TS 29.510 V16.50. This may include any one or more of the following criteria:

| Criteria name | Data type | Cardinality | Description |
| --- | --- | --- | --- |
| capacity | integer | 0 . . . 1 | Static capacity information within the range 0 to 65535, expressed as a weight relative to other NF instances of the same type; if capacity is also present in the nfServiceList parameters, those will have precedence over this value. |
| load | integer | 0 . . . 1 | Latest known load information of the NF within the range 0 to 100 in percentage. |
| locality | string | 0 . . . 1 | Operator defined information about the location of the NF instance (e.g. geographic location, data center). |
| priority | integer | 0 . . . 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute, which has precedence over the priority in xxxInfo parameter. |

In some embodiments, the criterion may be any criterion that is defined in Table 6.2.3.2.3.1-1 of 3GPP TS 29.510 V16.50, such as the following criterion:

| Criteria name | Data type | Cardinality | Description |
| --- | --- | --- | --- |
| preferred-locality | string | 0 . . . 1 | Preferred target NF location (e.g. geographic location, data center). When present, the NRF shall prefer NF profiles with a locality attribute that matches the preferred-locality. The NRF may return additional NFs in the response not matching the preferred target NF location, e.g. if no NF profile is found matching the preferred target NF location. The NRF should set a lower priority for any additional NFs on the response not matching the preferred target NF location than those matching the preferred target NF location. |

There is also provided a method performed by a system. The method comprises the method described herein in respect of the network node 10, 20 and the method described herein in respect of the NRF node 60. There is also provided a system comprising at least one network node 10, 20 as described herein and at least one NRF node 60 as described herein.

Figure 8:
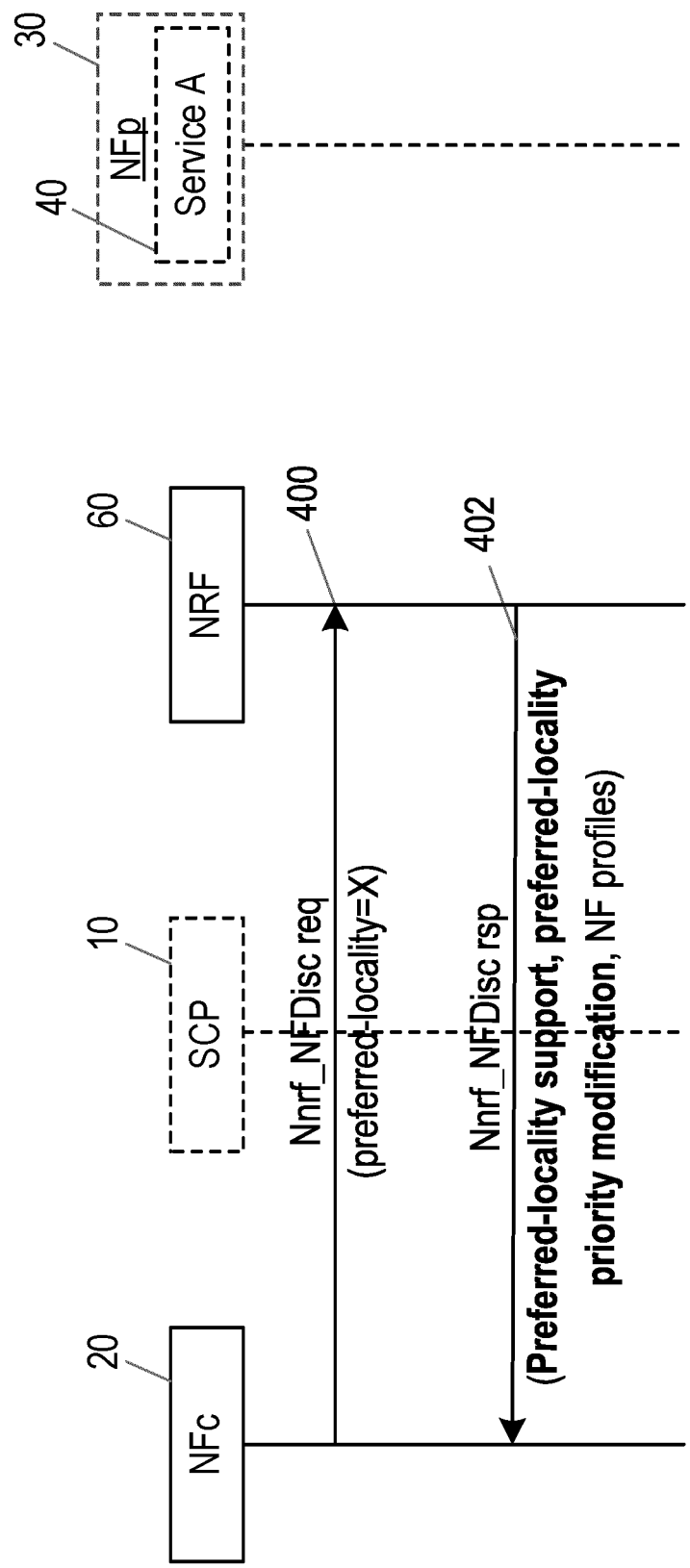
FIG. 8 is a signalling diagram illustrating an exchange of signals in a system according to an embodiment.

FIG. 8 is a signalling diagram illustrating an exchange of signals in a system according to an embodiment. The system illustrated in FIG. 8 comprises a first NF node 20 of a service consumer ("NFc") and an NRF node 60. The system illustrated in FIG. 8 may optionally also comprise a first SCP node 10 and/or a second NF node 30 of a service producer ("NFp"). The first SCP node 10 is configured to operate as an SCP between the first NF node 20 and the second NF node 30. The second NF node 30 can be configured to provide a service 40. The second NF node 30 can be part of a set of NF nodes of a service producer. In some embodiments, an entity may comprise the first SCP node 10 and the NRF node 60. That is, in some embodiments, the first SCP node 10 can be merged with the NRF node 60 in a combined entity. Although only one SCP node 10 and only one second NF node 30 is illustrated, the system illustrated in FIG. 8 can comprise one or more SCP nodes and/or one or more second NF nodes.

In some embodiments, the first SCP node 10 and the first NF node 20 may be deployed in independent deployment units, and/or the first SCP node 10 and any identified second NF nodes 30 may be deployed in independent deployment units. Thus, an SCP node based on independent deployment units is possible, as described in 3GPP TS 23.501 V16.4.0. In other embodiments, the first SCP node 10 may be deployed as a distributed network element. For example, in some embodiments, part (e.g. a service agent) of the first SCP node 10 may be deployed in the same deployment unit as the first NF node 20, and/or part (e.g. a service agent) of the first SCP node 10 may be deployed in the same deployment unit as any identified second NF nodes 30. Thus, an SCP node based on a service mesh is possible, as described in 3GPP TS 23.501 V16.4.0.

In some embodiments, at least one second SCP node may be configured to operate as an SCP between the first NF node 20 and the first SCP node 10, and/or at least one third SCP node may be configured to operate as an SCP between the first SCP node and any identified second NF nodes 30. Thus, a multipath of SCP nodes is possible. In some of these embodiments, the first SCP node 10 and one or more of the at least one second SCP node and the at least one third SCP node may be deployed in independent deployment units. In some embodiments, the at least one second SCP node and/or the at least one third SCP node may be deployed as distributed network elements.

FIG. 8 relates to a discovery process that is performed between the first NF node 20 and the NRF node 60. As illustrated by arrow 400 of FIG. 8, the first NF node 20 initiates transmission of a discovery request ("Nnrf_NFDisc req") towards the NRF node 60. The discovery request 400 may be transmitted directly from the first NF node 20 to the NRF node 60 (as illustrated in FIG. 8) or indirectly from the first NF node 20 to the NRF node 60, e.g. via the first SCP node 10. The NRF node 60 receives the discovery request 400. The discovery request 400 is a request for information indicative of one or more second NF nodes 30 for providing a service 40 requested by the first NF node 20.

In some embodiments, the discovery request 400 can comprise a criterion. The criterion can be considered an input parameter for the NRF node 60 discovery. The first NF node 20 may initiate transmission of the discovery request 400 comprising the criterion to indicate to the NRF node 60 that the criterion is to take precedence over any other criteria (e.g. priority). The criterion may be any of those mentioned earlier, such as a location of each second NF node 30, a load on each second NF node 30, a capacity of each second NF node 30, and/or any other criterion, or any combination of criteria. For the purpose of illustration, in FIG. 8, the criterion is a preferred location (e.g. preferred-locality=X) for the one or more second NF nodes 30 but it will be understood that any other criterion can be used. The NRF node 60 may or may not take into account the criterion when identifying any second NF nodes 30 to provide to the first NF node 20.

Although not illustrated in FIG. 8, in some embodiments, the NRF node 60 may perform the step of identifying any second NF nodes 30 for providing the service. If the criterion is supported by the NRF node 60, the identifying can be based on the criterion. Alternatively or in addition, in some embodiments, if a plurality of second NF nodes 30 are identified, the NRF node 60 may perform a step of prioritising the plurality of second NF nodes 30. If the plurality of second NF nodes 30 allow the plurality of second NF nodes 30 to be prioritised according to the criterion, the plurality of second NF nodes 30 can be prioritised according to the criterion. The plurality of second NF nodes 30 can be prioritised according to the criterion by assignment of a priority (e.g. a priority value) to each of the plurality of second NF nodes 30 according to the criterion. In this way, the plurality of second NF nodes 30 can be ordered or ranked based on the criterion.

For example, in embodiments where the criterion comprises a location of each second NF node 30, the plurality of second NF nodes 30 can be prioritised according to the criterion by assignment of a highest priority (e.g. a lowest priority value) to one or more of the plurality of second NF nodes 30 that are located at a predefined location. The predefined location can, for example, be a predefined geographic location, a predefined data center, or any other predefined location. In some embodiments, the predefined location may be the same location as the first NF node 20. For example, a second NF node 30 located at the same location as the first NF node 20 may be preferred over a second NF node 30 located at a different location from the first NF node 20. In some embodiments, the predefined location may be the closest location to the first NF node 20. In this way, it is possible to improve signalling and latency in the system.

Alternatively or in addition, in embodiments where the criterion comprises the load on each second NF node 30, the plurality of second NF nodes 30 can be prioritised according to the criterion by assignment of a highest priority (e.g. a lowest priority value) to one or more of the plurality of second NF nodes 30 that have the lowest load. Alternatively or in addition, in embodiments where the criterion comprises the capacity of each second NF node 30, the plurality of second NF nodes 30 can be prioritised according to the criterion by assignment of a highest priority (e.g. a lowest priority value) to one or more of the plurality of second NF nodes 30 that have the greatest available capacity.

As illustrated by arrow 402 of FIG. 8, the NRF node 60 initiates transmission of a discovery response ("Nnrf_NF-Disc rsp") towards the network node that initiated transmission of the discovery request towards the NRF node 60. This network node is the first NF node 20 in the embodiment illustrated in FIG. 8. The discovery response 402 may be transmitted directly from the NRF node 60 to the first NF node 20 (as illustrated in FIG. 8) or indirectly from the NRF node 60 to the first NF node 20, e.g. via the first SCP node 10. The discovery response 402 comprises first information indicative of any second NF nodes 30 identified for providing the service 40. This first information can also be referred to as the discovery results. As illustrated in FIG. 8, in some embodiments, for any identified second NF nodes 30, the first information can comprise a profile of the second NF node. A profile of a second NF node can comprise information that allows the first NF node 20 to target the second NF node 30, such as information identifying the second NF node 30 (e.g. an identifier that identifies the second NF node 30, such as an NF instance identifier), location information for the second NF node 30 (e.g. NF instance location information), and/or any other such information.

In other embodiments, where there are no second NF nodes 30 identified for providing the service, the first information may be an error message indicative that no second NF nodes 30 are identified for providing the service. In some embodiments, the error message may comprise a newly defined error code, i.e. an error code that is not already associated with an error in the art. The newly defined error code can be specifically indicative that no second NF nodes 30 are identified for providing the service. In other embodiments, the error message may comprise an existing error code, i.e. an error code already associated with another error in the art. However, in these embodiments, the error code may also be associated with information indicative that no second NF nodes 30 are identified for providing the service Advantageously, the discovery response 402 also comprises second information indicative of whether any second NF nodes 30 identified for providing the service are identified based on a criterion and/or, if a plurality of second NF nodes 30 are identified for providing the service, third information indicative of whether the plurality of second NF nodes 30 are prioritised according to the criterion. Thus, the discovery response 402 comprises new information. The second information and/or the third information can be for use by the first NF node 20 in selecting one or more second NF nodes, from any identified second NF nodes 30, to provide the service requested by the first NF node 20, and/or the second information can be for use by the first NF node 20 in determining whether to initiate a process to find one or more other second NF nodes 30 for providing the service.

As illustrated in FIG. 8, in some embodiments, if the criterion is supported by the NRF node 60, the second information can be indicative that any second NF nodes 30 identified for providing the service are identified based on the criterion (e.g. "preferred-locality"). Thus, in some embodiments, the first NF node 20 can be informed of whether the criterion is supported (or unsupported) by the NRF node 60.

Alternatively or in addition, in some embodiments, if the plurality of second NF nodes 30 allow the plurality of second NF nodes 30 to be prioritised according to the criterion (i.e. allow the prioritisation according to the criterion), the third information can be indicative that the plurality of second NF nodes 30 are prioritised according to the criterion. For example, the plurality of second NF nodes 30 may allow the plurality of second NF nodes 30 to be prioritised according to the criterion if the plurality of second NF nodes 30 support a change (or modification) to a priority already assigned to at least one second NF node of the plurality of second NF nodes 30 to allow the plurality of second NF nodes 30 to be prioritised according to the criterion. Thus, in some embodiments, the first NF node 20 can be informed of whether a change to a priority already assigned to at least one second NF node to allow the plurality of second NF nodes 30 to be prioritised according to the criterion (e.g. "preferred-locality priority modification") is allowed (or disallowed) by the plurality of second NF nodes 30. That is, the first NF node 20 can be informed of whether a priority already assigned to at least one second NF node can be overwritten to allow the plurality of second NF nodes 30 to be prioritised according to the criterion. In this way, priority overwriting can be avoided if it is not supported.

In some embodiments, the priority already assigned to the at least one second NF node 30 may be assigned based on a characteristic of the at least one second NF node 30. The characteristic may, for example, be a role of the at least one second NF node 30, e.g. whether the at least one second NF node 30 is active or inactive. In some of these embodiments, at least one active second NF node 30 may be already assigned a highest priority and/or at least one inactive second NF node 30 may be already assigned a lowest priority. Where the priority already assigned to the at least one second NF node 30 is used to identify a characteristic (e.g. a role) of the at least one second NF node 30, it may be that a change to that priority is avoided.

For example, if the at least one second NF node 30 requires that priority always takes precedence over locality, then the at least one second NF node 30 may indicate (e.g. set, such as in its profile) that a change to the priority already assigned to the at least one second NF node 30 is not allowed (e.g. "preferred-locality priority modification"=not allowed). On the other hand, if the at least one second NF node 30 allows locality to take precedence over priority, then it may indicate (e.g. set, such as in its profile) that a change to the priority already assigned to the at least one second NF node 30 is allowed (e.g. "preferred-locality priority modification"=allowed). In the example where at least one active second NF node 30 is already assigned to the highest priority, avoiding a change to this priority avoids the possibility of traffic reaching an inactive second NF node 30 where it will be rejected.

Although not illustrated in FIG. 8, in some embodiments, the NRF node 60 may acquire information indicative of whether (each of) the plurality of second NF nodes 30 support the change to allow the plurality of second NF nodes 30 to be prioritised according to the criterion (e.g. whether preferred-locality priority modification is allowed). For example, for at least one second NF node of the plurality of second NF nodes 30, information indicative of whether the at least one second NF node supports the change may be acquired from a profile (e.g. service profile) of the at least one second NF node according to some embodiments. Thus, the profile of each second NF node 30 can be updated with new information to indicate whether or not the second NF node 30 supports the change. In an example, a first value (e.g. of 1) may indicate that the second NF node 30 supports the change, whereas a second value (e.g. of 0) may indicate that the second NF node 30 does not support the change. In this way, the NRF node 60 is able to identify whether the at least one second NF node 30 supports (or does not support) the change. In some embodiments, the NRF node 60 may acquire the information indicative of whether (each of) the plurality of second NF nodes 30 support the change from (each of) the plurality of second NF nodes 30. For example, (each of) the plurality of second NF nodes 30 may initiate transmission of this information towards the NRF node 60 and the NRF node 60 may receive this information.

In some embodiments, if the plurality of second NF nodes 30 support the change to allow the plurality of second NF nodes 30 to be prioritised according to the criterion, the NRF node 60 may perform the step of changing (or modifying) the priority already assigned to at least one second NF node of the plurality of second NF nodes 30 to allow the plurality of second NF nodes 30 to be prioritised according to the criterion. Otherwise, if the plurality of second NF nodes 30 do not support the change to allow the plurality of second NF nodes 30 to be prioritised according to the criterion, changing the priority already assigned to at least one second NF node may be avoided.

It may be the case that the change is supported by at least one of the plurality of second NF nodes 30 and unsupported by the rest of the plurality of second NF nodes 30. In this case, according to some embodiments, the at least one of the plurality of second NF nodes 30 may be in a different set of NF nodes (e.g. by different vendors) to the rest of the plurality of second NF nodes 30. Thus, in some embodiments, at least two second NF nodes 30 may have different requirements as to whether the change is supported or unsupported. On the other hand, it may be the case that the change is supported by all second NF nodes of the plurality of second NF nodes 30 or unsupported by all second NF nodes of the plurality of second NF nodes 30. In order for the prioritisation of the plurality of second NF nodes 30 according to the criterion to be allowed (e.g. made possible), it may be that the priority already assigned to at least one second NF node (e.g. only one second NF node, multiple second NF nodes, or all second NF nodes) of the plurality of second NF nodes 30 needs to be changed.

Thus, as illustrated by arrow 402 of FIG. 8, the NRF node 60 initiates transmission of the discovery response ("Nnrf_NFDisc rsp") towards the first NF node 20 that initiated transmission of the discovery request towards the NRF node 60. The first NF node 20 thus receives the discovery response, which comprises the first information described earlier, and the second information described earlier and/or the third information described earlier.

Although not illustrated in FIG. 8, in some embodiments, the first NF node 20 may perform the step of selecting, using the second information and/or the third information, one or more second NF nodes, from any identified second NF nodes 30, to provide the service requested by the first NF node 20. Based on the second information and/or the third information, the first NF node 20 is able to apply the most suited criterion for selection of one or more second NF nodes 30. For example, locality with precedence over priority may be used by the first NF node 20 when it is not supported by the NRF node 60 but it is supported by the one or more second NF nodes 30. The first NF node 20 can be informed that the discovery results have not considered a criterion (e.g. "preferred-locality") even if that criterion was included in the discovery request 400. This allows the first NF node 20 to consider (based on second NF node 30 support) whether the criterion may still be the most applicable criterion.

The selection of one or more second NF nodes 30 referred to herein may be an initial selection (e.g. where one or more second NF nodes 30 have not been selected before) or a subsequent selection (e.g. where one or more second NF nodes 30 have been selected before). A subsequent selection may also be referred to as a reselection. Thus, any references to selection herein can be an initial selection or a reselection.

In some embodiments, if the criterion is supported by the NRF node 60 or if the criterion is unsupported by the NRF node 60 and the plurality of second NF nodes 30 disallow the plurality of second NF nodes 30 from being prioritised (i.e. do not allow the plurality of second NF nodes 30 to be prioritised) according to the criterion, the first NF node 20 may select the one or more second NF nodes 30 according to a priority assigned to each of the one or more second NF nodes 30 following the plurality of second NF nodes 30 being prioritised. In some of these embodiments, if a plurality of second NF nodes 30 are selected, the first NF node 20 may select a second NF node from the plurality of second NF nodes 30 according to the criterion or another criterion, e.g. at least one other (different) criterion. In some cases, the plurality of second NF nodes 30 may disallow the plurality of second NF nodes 30 from being prioritised (i.e. do not allow the plurality of second NF nodes 30 to be prioritised) according to the criterion if the plurality of second NF nodes 30 are unsupportive of a change to a priority already assigned to at least one second NF node of the plurality of second NF nodes 30 to allow the plurality of second NF nodes 30 to be prioritised according to the criterion.

An example of the selection according to these embodiments, performed by the nodes illustrated in FIG. 8, is as follows: NRF node 60 does support "preferred-locality" and NFp node 30 does allow "preferred-locality priority modification". NRF node 60 provides preferred results (with altered priority) and informs NFc node 20 that NRF node 60 does support "preferred-locality" and NFp node 30 does allow "preferred-locality priority modification". NFc node 20 knows that the provided results take locality into account. Then, NFc node 20 may apply (re)selection among the provided results using priority first. The order in (re)selection achieved is locality first, then priority.

Another example of the selection according to these embodiments, performed by the nodes illustrated in FIG. 8, is as follows: NRF node 60 does support "preferred-locality" and NFp node 30 does not allow "preferred-locality priority modification". NRF node 60 provides all results ignoring "preferred-locality" (with unaltered priority) and informs NFc node 20 that NRF node 60 does support "preferred-locality" and NFp node 20 does not allow "preferred-locality priority modification". NFc node 20 knows that the provided results do not take locality into account and that this is not supported by NFp node 30. NFc node 20 may apply (re)selection among the provided results using priority first and, only if there are multiple results with same priority, it may use locality to (re)select among them. The order in (re)selection achieved is priority first, then locality.

Another example of the selection according to these embodiments, performed by the nodes illustrated in FIG. 8, is as follows: NRF node 60 does not support "preferred-locality" and NFp node 30 does not allow "preferred-locality priority modification". NRF node 60 provides all results ignoring "preferred-locality" (with unaltered priority) and informs NFc node 20 that NRF node 60 does not support "preferred-locality" and NFp node 30 does not allow "preferred-locality priority modification". NFc node 20 knows that the provided results do not take locality into account and that this is not supported by NFp node 30. NFc node 20 may apply (re)selection among the provided results using priority first and, only if there are multiple results with same priority, it may use locality to (re)select among them. The order in (re)selection achieved is priority first, then locality.

In some embodiments, if the criterion is unsupported by the NRF node 60 and the plurality of second NF nodes 30 allow the plurality of second NF nodes 30 to be prioritised according to the criterion, the first NF node 20 may select the one or more second NF nodes according to the criterion. In some of these embodiments, if a plurality of second NF nodes 30 are selected, the first NF node 20 may select a second NF node from the plurality of second NF nodes 30 according to a priority assigned to each of the one or more second NF nodes following the plurality of second NF nodes 30 being prioritised.

An example of the selection according to these embodiments, performed by the nodes illustrated in FIG. 8, is as follows: NRF node 60 does not support "preferred-locality" and NFp node 30 does allow "preferred-locality priority modification". NRF node 60 provides all results ignoring "preferred-locality" (with unaltered priority) and informs NFc node 20 that NRF node 60 does not support "preferred-locality" and NFp node 30 does allow "preferred-locality priority modification". NFc node 20 knows that the provided results do not take locality into account, but the NFp node 30 does support it. NFc node 20 may apply (re)selection among the provided results using locality first and, only if there are multiple results with same locality, it may use priority to (re)select among them. In this case, the NFc node 20 can (re)select based on locality even if NRF node 60 does not support it. The order in (re)selection achieved is locality first, then priority.

Any of the criteria referred to herein may be used (alone or in combination with one or more other criteria) for selecting one or more second NF nodes 30 in the manner described herein. In some embodiments, the priority and capacity criteria may be used for selecting one or more second NF nodes 30 in the same way that priority and weight are used for server selection as defined in IETF RFC 2782. For example, according to IETF RFC 2782, a client must attempt to contact a target host with the lowest-numbered priority it can reach. Thus, in some embodiments, the first NF node 20 may select one or more second NF nodes 30 with the lowest numbered priority. As also described in IETF RFC 2782, target hosts with the same priority should be tried in an order defined by a weight field. Thus, in some embodiments, the first NF node 20 may select second NF nodes 30 with the same (e.g. lowest numbered) priority in an order defined by a weight field.

Alternatively or in addition to the selection of one or more second NF nodes 30 described earlier, in some embodiments, the first NF node 20 may perform the step of determining, using the second information, whether to initiate a process to find one or more other second NF nodes for providing the service. In some embodiments, the one or more other second NF nodes can comprise one or more second NF nodes 30 previously identified and/or one or more different second NF nodes to the one or more second NF nodes 30 previously identified, e.g. the one or more other second NF nodes may comprise every second NF node according to some embodiments. In some embodiments, if the first information is indicative that no second NF nodes 30 are identified for providing the service and/or the second information is indicative that any second NF nodes 30 identified for providing the service are not identified based on the criterion, the first NF node 20 may initiate a process to find one or more other second NF nodes 30 for providing the service. In some embodiments involving such a process, the process may comprise transmission of a further discovery request towards the NRF node 60. The further discovery request can be a request for information indicative of one or more other second NF nodes 30 for providing a service. In some embodiments, the further discovery request may be transmitted without the criterion.

Although the example of initiating transmission of a further discovery request has been mentioned, it will be understood that this is only one example of a process by which one or more other second NF nodes may be found and any other means of finding one or more other second NF nodes may be used. A person skilled in the art will be aware of various techniques that can be used for this purpose. In some embodiments, any of the criteria referred to herein (e.g. the capacity and/or priority criteria) may be used for load balancing.

Figure 9:
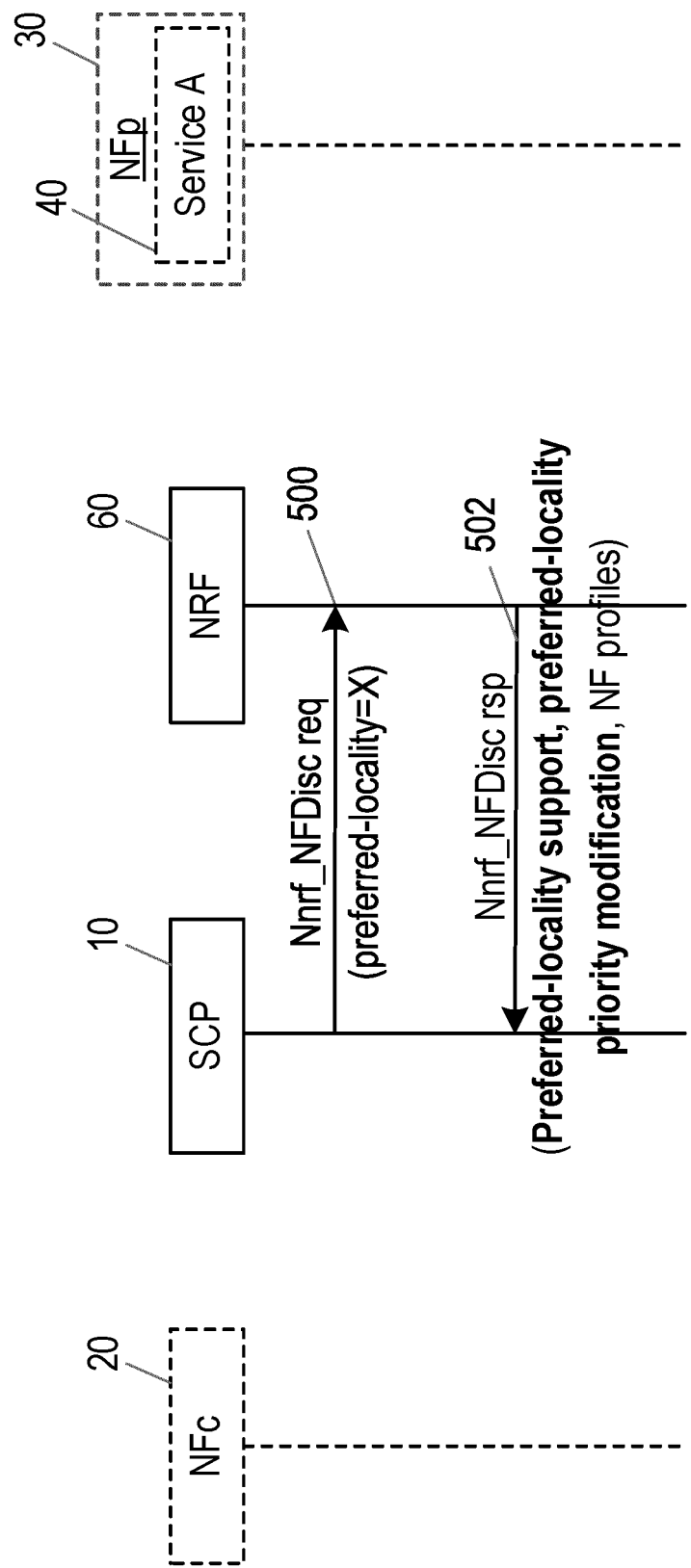
FIG. 9 is a signalling diagram illustrating an exchange of signals in a system according to an embodiment.

FIG. 9 is a signalling diagram illustrating an exchange of signals in a system according to another embodiment. The system and corresponding technique illustrated in FIG. 9 is as described earlier with reference to FIG. 8, except that the network node in FIG. 9 is the first SCP node 10, rather than the first NF node 20. Thus, the steps that are described with reference to FIG. 8 as being performed by the first NF node 20 are instead performed by the first SCP node 10 in FIG. 9. For example, transmission of the discovery request 500 of FIG. 9 is initiated by the first SCP node 10 and transmission of the discovery response 502 of FIG. 9 is initiated towards the first SCP node 10. Thus, the description above also applies to FIG. 9, with any references to "the first NF node" replaced with "the first SCP node".

There is also provided a computer program comprising instructions which, when executed by processing circuitry (such as the processing circuitry 12 of the network node 10, 20 described earlier and/or the processing circuitry 62 of the NRF node 60 described earlier), cause the processing circuitry to perform at least part of the method described herein. There is provided a computer program product, embodied on a non-transitory machine-readable medium, comprising instructions which are executable by processing circuitry (such as the processing circuitry 12 of the network node 10, 20 described earlier and/or the processing circuitry 62 of the NRF node 60 described earlier) to cause the processing circuitry to perform at least part of the method described herein. There is provided a computer program product comprising a carrier containing instructions for causing processing circuitry (such as the processing circuitry 12 of the network node 10, 20 described earlier and/or the processing circuitry 62 of the NRF node 60 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the network node functionality and/or the NRF node functionality described herein can be performed by hardware. Thus, in some embodiments, any one or more of the network node 10, 20 and the NRF node 60 described herein can be a hardware node. However, it will also be understood that optionally at least part or all of the network node functionality and/or the NRF node functionality described herein can be virtualized. For example, the functions performed by any one or more of the network node 10, 20 and the NRF node 60 described herein can be implemented in software running on generic hardware that is configured to orchestrate the node functionality. Thus, in some embodiments, any one or more of the network node 10, 20 and the NRF node 60 described herein can be a virtual node. In some embodiments, at least part or all of the network node functionality and/or the NRF node functionality described herein may be performed in a network enabled cloud. The network node functionality and/or the NRF node functionality described herein may all be at the same location or at least some of the node functionality may be distributed.

It will be understood that at least some or all of the method steps described herein can be automated in some embodiments. That is, in some embodiments, at least some or all of the method steps described herein can be performed automatically. The method described herein can be a computer-implemented method.

Thus, in the manner described herein, there are advantageously provided improved techniques for handling discovery requests and responses in a network.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of handling a discovery request in a network, performed by a network repository function (NRF) node, the method comprising:
   receiving the discovery request; and
   initiating transmission of a discovery response towards a network node that initiated transmission of the discovery request towards the NRF node;
   wherein the network node is a first network function (NF) node of a service consumer or a first service communication proxy (SCP) node that is configured to operate as an SCP between the first NF node and second NF nodes of at least one service producer;
   wherein the discovery request is a request for information indicative of one or more second NF nodes for providing a service requested by the first NF node;
   wherein the discovery response comprises:
      first information indicative of a plurality of second NF nodes identified for providing the service;
      second information indicative of whether the plurality of second NF nodes identified for providing the service are identified based on a criterion; and
      third information indicative of whether the plurality of second NF nodes are prioritized according to the criterion; and
   wherein the plurality of second NF nodes support a change to a priority already assigned to at least one second NF node of the plurality of second NF nodes to allow the plurality of second NF nodes to be prioritized according to the criterion.

2. The method of claim 1, wherein the priority already assigned to the at least one second NF node is assigned based on whether the at least one second NF node is active or inactive.

3. The method of claim 1, the method comprising acquiring information indicative of whether the plurality of second NF nodes support the change to allow the plurality of second NF nodes to be prioritized according to the criterion.

4. The method of claim 1, wherein, for at least one second NF node of the plurality of second NF nodes, information indicative of whether the at least one second NF node supports the change is acquired from a profile of the at least one second NF node.

5. The method of claim 1, the method further comprising changing the priority already assigned to the at least one second NF node of the plurality of second NF nodes.

6. The method of claim 1, wherein the change is supported by the at least one of the plurality of second NF nodes and is unsupported by the rest of the plurality of second NF nodes.

7. The method of claim 1, wherein the at least one of the plurality of second NF nodes is in a different set of NF nodes to the rest of the plurality of second NF nodes.

8. The method of claim 1, wherein:
   at least one second SCP node is configured to operate as an SCP between the first NF node and the first SCP node; and/or
   at least one third SCP node is configured to operate as an SCP between the first SCP node and any identified second NF nodes.

9. The method of claim 8, wherein:
   the first SCP node and one or more of the at least one second SCP node and the at least one third SCP node are deployed in independent deployment units; or
   the at least one second SCP node and/or the at least one third SCP node are deployed as distributed network elements.

10. A network repository function (NRF) node comprising:
    processing circuitry and memory, the memory containing instructions executable by the processing circuitry whereby the NRF is configured to:
       receive a discovery request; and
       initiate transmission of a discovery response towards a network node that initiated transmission of the discovery request towards the NRF node;
    wherein the network node is a first network function (NF) node of a service consumer or a first service communication proxy (SCP) node that is configured to operate as an SCP between the first NF node and second NF nodes of at least one service producer;
    wherein the discovery request is a request for information indicative of one or more second NF nodes for providing a service requested by the first NF node;
    wherein the discovery response comprises:
       first information indicative of a plurality of second NF nodes identified for providing the service;
       second information indicative of whether the plurality of second NF nodes identified for providing the service are identified based on a criterion; and/or
       third information indicative of whether the plurality of second NF nodes are prioritized according to the criterion; and
    wherein the plurality of second NF nodes support a change to a priority already assigned to at least one second NF node of the plurality of second NF nodes to allow the plurality of second NF nodes to be prioritized according to the criterion.

11. The NRF of claim 10, wherein the priority already assigned to the at least one second NF node is assigned based on whether the at least one second NF node is active or inactive.

12. The NRF of claim 10, wherein the NRF is further configured to acquire information indicative of whether the plurality of second NF nodes support the change to allow the plurality of second NF nodes to be prioritized according to the criterion.

13. The NRF of claim 10, wherein, for at least one second NF node of the plurality of second NF nodes, information indicative of whether the at least one second NF node supports the change is acquired from a profile of the at least one second NF node.

14. The NRF of claim 10, wherein the NRF is further configured to change the priority already assigned to at least one second NF node of the plurality of second NF nodes.

15. The NRF of claim 10, wherein the change is supported by at least one of the plurality of second NF nodes and is unsupported by the rest of the plurality of second NF nodes.

16. The NRF of claim 15, wherein the at least one of the plurality of second NF nodes is in a different set of NF nodes to the rest of the plurality of second NF nodes.

17. The NRF of claim 10, wherein:
    at least one second SCP node is configured to operate as an SCP between the first NF node and the first SCP node; and/or
    at least one third SCP node is configured to operate as an SCP between the first SCP node and any identified second NF nodes.

18. The NRF of claim 17, wherein:
    the first SCP node and one or more of the at least one second SCP node and the at least one third SCP node are deployed in independent deployment units; or the at least one second SCP node and/or the at least one third SCP node are deployed as distributed network elements.

19. A method, performed by a system comprising a network repository function (NRF) and a network node, the method comprising:
  initiating, by the network node, transmission a discovery request towards the NRF node;
  receiving, by the NRF node, the discovery request;
  initiating, by the NRF node, transmission of the discovery response towards the network node that initiated transmission of the discovery request towards the NRF node;
  receiving, by the network node, a discovery response from the NRF node;
  wherein the network node is a first network function (NF) node of a service consumer or a first service communication proxy (SCP) node that is configured to operate as an SCP between the first NF node and second NF nodes of at least one service producer;
  wherein the discovery request is a request for information indicative of one or more second NF nodes for providing a service requested by the first NF node, and wherein the discovery response comprises:
    first information indicative of a plurality of second NF nodes identified for providing the service;
    second information indicative of whether the plurality of second NF nodes identified for providing the service are identified based on a criterion; and
    third information indicative of whether the plurality of second NF nodes are prioritized according to the criterion; and
  wherein the plurality of second NF nodes support a change to a priority already assigned to at least one second NF node of the plurality of second NF nodes to allow the plurality of second NF nodes to be prioritized according to the criterion.

20. A system comprising:
  a network node and a network repository function (NRF) node;
  wherein the network node is configured to:
    initiate transmission a discovery request towards the NRF node; and
    receive a discovery response from the NRF node;
  wherein the NRF node is configured to:
    receive the discovery request; and
    initiate transmission of a discovery response towards the network node that initiated transmission of the discovery request towards the NRF node;
  wherein the network node is a first network function (NF) node of a service consumer or a first service communication proxy (SCP) node that is configured to operate as an SCP between the first NF node and second NF nodes of at least one service producer;
  wherein the discovery request is a request for information indicative of one or more second NF nodes for providing a service requested by the first NF node, and wherein the discovery response comprises:
    first information indicative of a plurality of second NF nodes identified for providing the service;
    second information indicative of whether the plurality of second NF nodes identified for providing the service are identified based on a criterion; and
    third information indicative of whether the plurality of second NF nodes are prioritized according to the criterion; and
  wherein the plurality of second NF nodes support a change to a priority already assigned to at least one second NF node of the plurality of second NF nodes to allow the plurality of second NF nodes to be prioritized according to the criterion.

* * * * *